Sept. 16, 1924.
W. A. BAKER
1,508,437
HOT AIR PIPE FOR CARBURETORS
Filed July 13, 1923    2 Sheets-Sheet 1
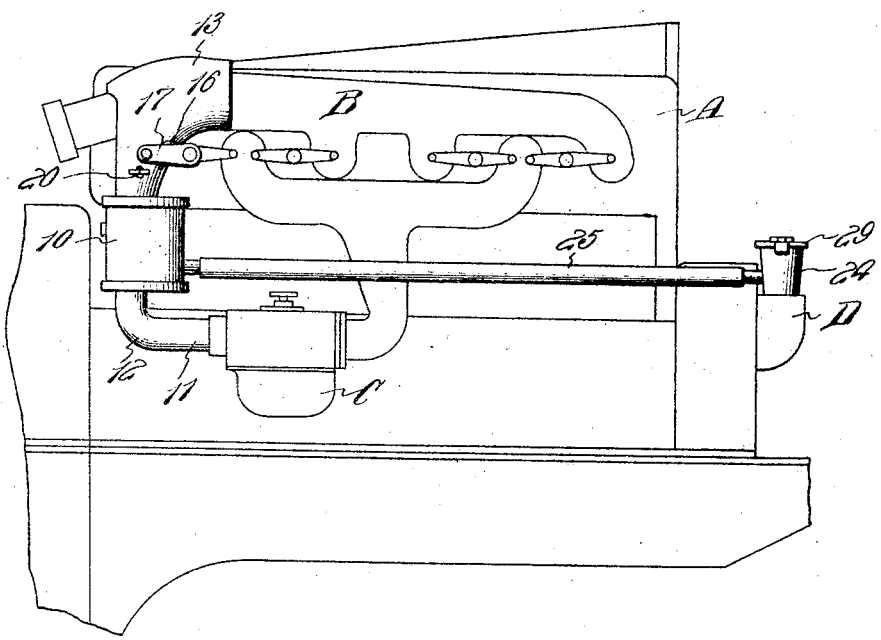
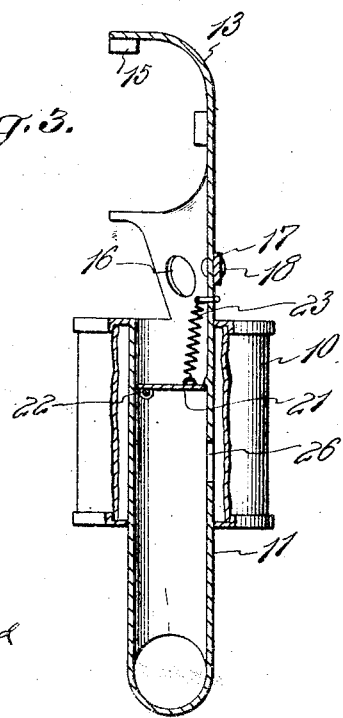
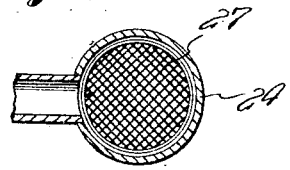
W. A. Baker
INVENTOR
BY Victor J. Evans
ATTORNEY
WITNESS

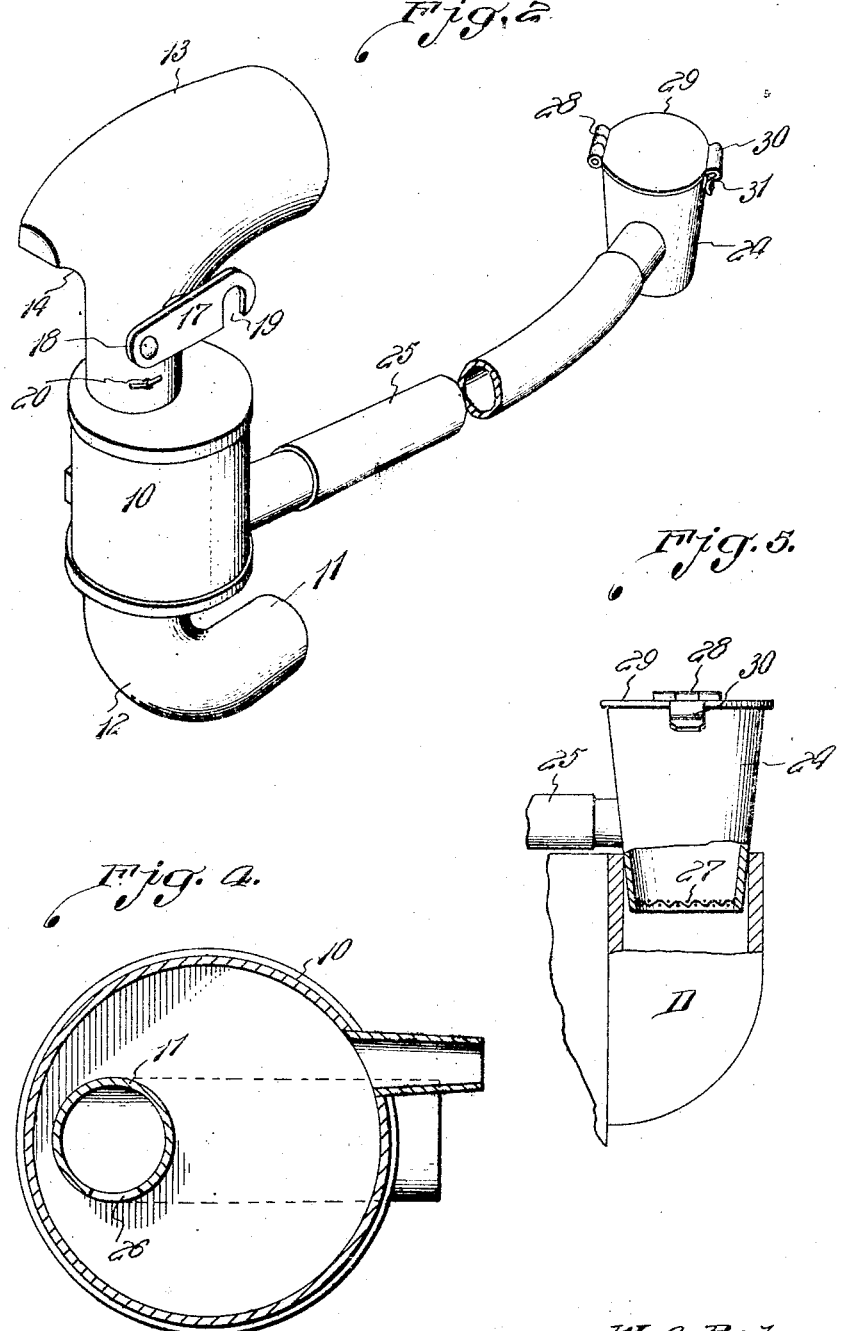

Patented Sept. 16, 1924.

1,508,437

UNITED STATES PATENT OFFICE.

WILLIAM A. BAKER, OF ELGIN, TEXAS, ASSIGNOR TO BAKER GAS SAVER COMPANY, OF ELGIN, TEXAS.

HOT-AIR PIPE FOR CARBURETORS.

Application filed July 13, 1923. Serial No. 651,384.

*To all whom it may concern:*

Be it known that I, WILLIAM A. BAKER, a citizen of the United States, residing at Elgin, in the county of Bastrop and State of Texas, have invented new and useful Improvements in Hot-Air Pipes for Carburetors, of which the following is a specification.

This invention relates to attachments or accessories for internal combustion engines, and has for its object the provision of a novel device for admitting the proper quantity of hot air to the air inlet of a carburetor, the air conduit being provided internally with a valve automatically controlled by suction of the engine pistons.

Another object is the provision of a device of this character provided with means whereby the waste gases which accumulate within the crank case may be conducted from the breather pipe into a chamber which forms part of my device and subsequently led to the engine whereby they may be utilized.

Another object is the provision of a device of this character which will be simple and inexpensive to manufacture and install, positive and efficient in action, and a general improvement in the art.

With the above and other objects and advantages in view the invention consists in the details of construction to be hereinafter more fully described and claimed and illustrated in the accompanying drawings, in which:

Figure 1 is a side elevation of an automobile engine showing my device in applied position, Figure 2 is a perspective view of my hot air pipe structure removed from the engine, Figure 3 is a longitudinal section therethrough, Figure 4 is a cross sectional view, Figure 5 is a detail section through the breather pipe showing the connection of my device therewith, Figure 6 is a detail view of the breather cap.

Referring more particularly to the drawings the letter A designates an internal combustion engine, B represents the exhaust manifold, C the carburetor and D the breather pipe through which oil is fed to the crank case.

In carrying out my invention I provide a cylindrical casing or drum 10 through which extends a conduit 11 which has one end laterally curved as indicated at 12 for insertion within the air inlet of the carburetor. Connected with but preferably formed integrally with the conduit 11 is a shell or shield 13 which is cut away as shown at 14 so as to be disposed against the exhaust manifold. The forward end of this shell portion is not flanged like the rear end but is provided with ears 15 which bear against the manifold while defining spaces through which air may enter. At a point near its juncture with the drum or casing the shell is formed with an opening 16.

For supporting and bracing the device, I provide an arm 17 pivoted at 18 on the shell member adjacent its juncture with the drum and the free end of this arm is formed with a notch or slot 19 so that it may be engaged beneath the head of one of the engine bolts subsequent to loosening thereof. Below the pivot point 18 the shell is provided with a small hole 20.

One of the vital features of the present device is a butterfly valve 21 located within the conduit at a point spaced somewhat below the top thereof, which butterfly valve is carried by a bolt or rod 22. This valve is normally held closed by a coil spring 23 but it opens automatically under the influence of the suction produced in the engine by the working of the pistons. The device is well adapted for use in the exact condition above described and in actual practice it has been found that the running of the engine is greatly improved as the action is smoother and the fuel consumption lower.

In addition to the above described parts it is advantageous to provide means for utilizing the gases which accumulate within the crank case and which are ordinarily wasted. In carrying out this feature I provide a tube 24 which is inserted within the breather pipe D, and extending into this tube is a tube 25 leading into the drum 10 near the lower portion thereof. Communication between the drum and the conduit is established by a suitable opening 26 so that the gases from the crank case will be drawn from the breather and through the tube 25 into the drum and thence into the conduit and to the carburetor. The bottom of the tube member 24 is provided with a screen 27 and is intended to remain permanently in the breather pipe of the engine. The purpose of the screen is to strain any dirt out of oil poured into the breather. Hinged at 28 upon this tube member is a cover 29 having a spring catch 30 co-operating with a keeper 31 on the shell member. When replenishing the oil supply in the engine it is merely necesssary to lift up and swing back this cover, thus avoiding interfering in any way with the member 24.

With this attachment the operation is of course the same as without it except that in this instance whatever gases accumulate in the crank case by vaporization of the oil therein or by leakage past the pistons is utilized and made to do useful work instead of being permitted to escape into the atmosphere.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A hot air supply for engine carburetors comprising a drum, a conduit extending through the drum and having one end inserted within the air inlet of the carburetor and having its other end formed as an open sided shield engaged against the exhaust manifold, means for holding the device in position, a tube leading from the breather pipe of the engine into said drum, means establishing communication between the drum and the conduit a valve within the conduit.

2. A hot air supply for engine carburetors comprising a drum, a conduit extending through the drum and having one end inserted within the air inlet of the carburetor and having its other end formed as an open sided shield engaged against the exhaust manifold, means for holding the device in position, and a normally spring closed and suction opened butterfly valve within the conduit, the drum communicating with the conduit through an opening, and a tube leading from the breather pipe into said drum.

3. A hot air supply device for engine carburetors, comprising a drum, a vapor collecting element engaged within the breather pipe of the engine, a tube extending from said element into the drum, a conduit extending through the drum and connected with the air inlet of the carburetor, said conduit having an enlarged portion partially embracingly engaged upon the exhaust manifold.

In testimony whereof I affix my signature.

WILLIAM A. BAKER.